(12) United States Patent
Darányi et al.

(10) Patent No.: US 9,974,146 B2
(45) Date of Patent: May 15, 2018

(54) COMMISSIONING METHOD OF LIGHTING CONTROL SYSTEM USING VISUAL LIGHT COMMUNICATION

(71) Applicant: GENERAL ELECTRIC COMPANY, Schenectady, NY (US)

(72) Inventors: Tamás Darányi, BudaPest (HU); Michael James Hartman, Clifton Park, NY (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 0 days. days.

(21) Appl. No.: 14/866,825

(22) Filed: Sep. 25, 2015

(65) Prior Publication Data

US 2017/0094755 A1 Mar. 30, 2017

(51) Int. Cl.
| | |
|---|---|
| H05B 33/08 | (2006.01) |
| H05B 37/02 | (2006.01) |
| H04B 10/116 | (2013.01) |
| G06F 3/0484 | (2013.01) |

(52) U.S. Cl.
CPC ..... *H05B 37/0272* (2013.01); *G06F 3/04847* (2013.01); *H04B 10/116* (2013.01)

(58) Field of Classification Search
None
See application file for complete search history.

(56) References Cited

U.S. PATENT DOCUMENTS

| 6,583,573 B2 | 6/2003 | Bierman |
| 7,307,542 B1 | 12/2007 | Chandler et al. |
| 8,373,362 B2 | 2/2013 | Chemel et al. |
| 8,729,835 B2 | 5/2014 | Henig et al. |
| 8,749,146 B2 | 6/2014 | Jones |
| 2013/0183042 A1* | 7/2013 | Knapp ............... G08C 23/04 398/106 |
| 2014/0001963 A1 | 1/2014 | Chobot et al. |
| 2014/0088772 A1 | 3/2014 | Lelkens |
| 2014/0333206 A1 | 11/2014 | Simons et al. |
| 2015/0372753 A1* | 12/2015 | Jovicic ............. H04B 10/116 398/172 |
| 2016/0037293 A1* | 2/2016 | Jovicic ............. H04W 4/02 398/118 |

(Continued)

FOREIGN PATENT DOCUMENTS

WO 2012131631 A1 10/2012

OTHER PUBLICATIONS

Massa, "Choosing an Ultrasonic Sensor for Proximity or Distance Measurement. Part 1: Acoustic Considerations", Sensors, pp. 34-37, Feb. 1999.

(Continued)

*Primary Examiner* — Dedei K Hammond
(74) *Attorney, Agent, or Firm* — Peter T. DiMauro; GE Global Patent Operation

(57) ABSTRACT

Provided is a lighting system that includes a plurality of luminaires, at least one controller in communication with the luminaires via a communication line in a network, and configured to control the luminaires, and a lighting control system including a smart device which wirelessly communicates with the at least one controller and the plurality of the luminaires, and performs a commissioning operation of the luminaires in the network using visual light communication (VLC).

13 Claims, 7 Drawing Sheets

(56) References Cited

U.S. PATENT DOCUMENTS

2017/0041886 A1* 2/2017 Baker .................. H04W 4/008

OTHER PUBLICATIONS

"Introduction to the Commissioning Process", Lighting Controls Association, http://lightingcontrolsassociation.org/introduction-to-the-commissioning-process/, pp. 1-11, Dec. 17, 2012.
Basu et al., "Sensor-Based Predictive Modeling for Smart Lighting in Grid-Integrated Buildings", IEEE Sensors Journal, vol. No. 14, Issue No. 12, pp. 4216-4229, Dec. 2014.

* cited by examiner ns, models, # COMMISSIONING METHOD OF LIGHTING CONTROL SYSTEM USING VISUAL LIGHT COMMUNICATION

I. TECHNICAL FIELD

The present invention relates generally to a lighting system. In particular, the present invention relates a commissioning method implemented by a lighting control system using visual light communication (VLC) to locate endpoints (e.g., luminaires) in a lighting system.

II. BACKGROUND

A networked lighting system typically includes a group of luminaires, lighting sensors, and motion sensors interconnected together in a communication network. The communication network may be wired or RF technology, for example. Networked lighting systems are typically installed in large buildings, such as offices, retail stores, airports, stadiums, hospitals, etc.

A lighting control system is generally employed to control the luminaires in premise or remotely, control based on information (e.g., intensity level status information) sensed by the sensors, like daylight harvesting, motion based control. There are also maintenance and monitoring aspects e.g. energy monitoring, failure monitoring. The luminaires are incorporated into the lighting control system by the performance of a commissioning process. The commissioning process is the process of setting up the networked lighting system by matching previously given digital random addresses to the exact physical location of the lamps and defining a desired operation by associating switches and sensors with the luminaires such that the luminaires are operated individually or in groups by specific switches and sensors while the overall network is managed by a controller.

The devices (i.e., luminaires, switches and sensors) may be assigned network addresses to receive and perform command signals from the controller. The commissioning process further involves mapping the location of the physical components on a building layout with the network addresses.

In existing commissioning processes, an operator may install the devices, then manually record the network address of each fixture on the building layout, and connect all the devices. The operator has to walk around several times to find the endpoint (i.e., the luminaire). The operator manually enters network addresses assigned to the devices into a database and defines the control functions to be implemented. The manual process can be very time-consuming and expensive. As the number of luminaires in a building increases, the complexity of the commissioning process can increase.

III. SUMMARY OF THE EMBODIMENTS

Embodiments of the present invention provide a VLC-aided commissioning method of a lighting system and a lighting control system performing the commissioning method.

In one exemplary embodiment, a lighting system is provided. The lighting system includes a plurality of luminaires, at least one controller in communication with the luminaires via a communication line in a network, and configured to control the luminaires, and a lighting control system including a smart device which wirelessly communicates with the at least one controller and the plurality of the luminaires, and performs a commissioning operation of the luminaires in the network using VLC.

According to yet another exemplary embodiment, a method for commissioning a lighting system including a plurality of luminaires is provided. The method includes wirelessly communicating between a smart device and at least one controller of the lighting system within a network; and performing, by the smart device, a commissioning operation of the plurality of luminaires using VLC.

The foregoing has broadly outlined some of the aspects and features of various embodiments, which should be construed to be merely illustrative of various potential applications of the disclosure. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

IV. DESCRIPTION OF THE DRAWINGS

Figure 1:
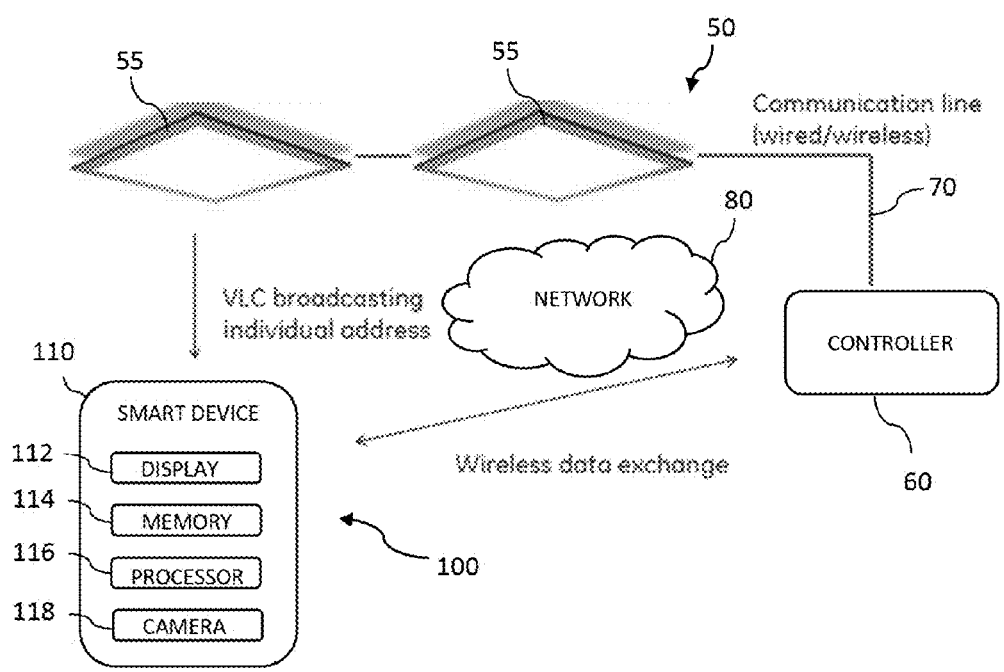
FIG. 1 is a schematic illustrating an example of a lighting control system for commissioning a lighting system that can be implemented within one or more embodiments of the present invention.

The drawings are only for purposes of illustrating preferred embodiments and are not to be construed as limiting the disclosure. Given the following enabling description of the drawings, the novel aspects of the present disclosure should become evident to a person of ordinary skill in the art. This detailed description uses numerical and letter designations to refer to features in the drawings. Like or similar designations in the drawings and description have been used to refer to like or similar parts of embodiments of the invention.

V. DETAILED DESCRIPTION OF THE EMBODIMENTS

As required, detailed embodiments are disclosed herein. It must be understood that the disclosed embodiments are merely exemplary of various and alternative forms. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Embodiments of the present invention provide a lighting control system and commissioning method for a lighting system. The lighting control system can control the illumination levels, user presence and movement or interference in a building automation related setting. The system identifies each endpoint (e.g., luminaires, sensors and switches) using a unique identification (ID) number (e.g., a network address) associated with the endpoint. Upon initial installation or replacement of the luminaires, the given network addresses which are previously and randomly given are matched with physical locations during the performance of a commissioning process. The commissioning process is performed using VLC-aided technology. VLC is a data communications medium which uses visual light to transmit signals.

FIG. 1 is a schematic illustrating an example of a lighting control system 100 for commissioning a lighting system 50 that can be implemented within one or more embodiments of the present invention.

The lighting system 50 includes a plurality of luminaires 55 in communication with sensors and control devices such as dimmers and switches, and a controller 60. In the lighting system 50, the controller 60 acts as a master and the endpoints (e.g., the luminaires 55, sensors and control devices) acts as slaves. The controller 60 is configured to set the illumination level of each luminaire 55 as a function of the sensor outputs and settings of the control devices. The luminaires 55 are interconnected together and in communication with the controller 60 via a communication line 70 in a network 80. Although only one controller is shown in the drawings for purposes of illustration, the system may include a plurality of controllers 60 having more luminaires 55 communicating on the same network 80 and it also can be wireless.

In one or more embodiments, the luminaires 55 can include one or more lighting emitting elements such as incandescent or fluorescent bulbs, arrays of light emitting diodes (LEDs), retrofit replacement LED lamps, halogen with digital ballast, or track lights etc. The luminaires 55 can be separate or group together and installed in different locations within a building (e.g., an airport or office building). The physical location of some of the luminaires 55 may be known while the physical location of other luminaires 55 may be unknown.

The network 80 can be a local area network (LAN) or a wide area network (WAN) such as the Internet. The network environment may be a IEEE 802.11 (Wi-Fi or Wireless LAN network), IEEE 802.16 (WiMAX) network, IEEE 802.16c network or any other suitable network.

The luminaires 55 are connected directly or indirectly to the controller 60 either wirelessly or hard-wired by the communication line 70.

In the embodiments, the lighting control system 100 includes a smart device 110 in communication with the lighting system 50.

The smart device 110 can be a portable device, such as a portable smart phone or tablet capable of wirelessly communicating with (e.g., receiving and analyze VLC signals of the lighting system 50 using VLC, and is also capable of remotely performing configuration and high-level operations of the lighting system 50. The smart device 110 includes a display 112 including a graphical user interface (GUI), a memory 114, a processor 116 and a camera 118. The smart device 110 further includes a network interface for connected with the network 80 and additional I/O devices (e.g., a keyboard and a pointing device). The memory is a computer readable storage media that may store instructions that implement at least portions of the described technology. In addition, the data structures and message structures may be stored or transmitted via a data transmission medium such as a signal on a communication link. The computer readable media can include computer-readable storage media (e.g., "non-transitory" media) and computer-readable transmission media. The instructions stored in the memory 114 can be implemented as software and/or firmware to program the processor 116 to carry out actions described herein. The camera 118 is configured to wirelessly communicate with the luminaires 55 and the controller 60 using VLC. According to one or more embodiments of the present invention, the smart devices can optionally have accelerometers, gyroscopes, and magnetometers that can be used for inertial navigation to estimate the operator's location as they move between luminaires with known and unknown physical locations.

As shown in FIG. 1, the smart device 110 wirelessly exchanges data with the controller 60 of the lighting system 50 in the network 80. The wireless communication between the smart device 110 and the controller 60 enables an operator to walk around below the luminaires 55. The smart device 110 controls the luminaires 55 and performs the commissioning process using the GUI on the display 112. The GUI may be in the form of a software program running on the smart device 110 configurable to perform high-level operations during the commissioning process. The smart device 110 controls the luminaires 55 by transmitting data including command signals and status information for each luminaire 55. The smart device 110 performs the commissioning process using VLC in accordance with embodiments of the present invention as discussed below with reference to FIGS. 2 through 7.

Figure 2:
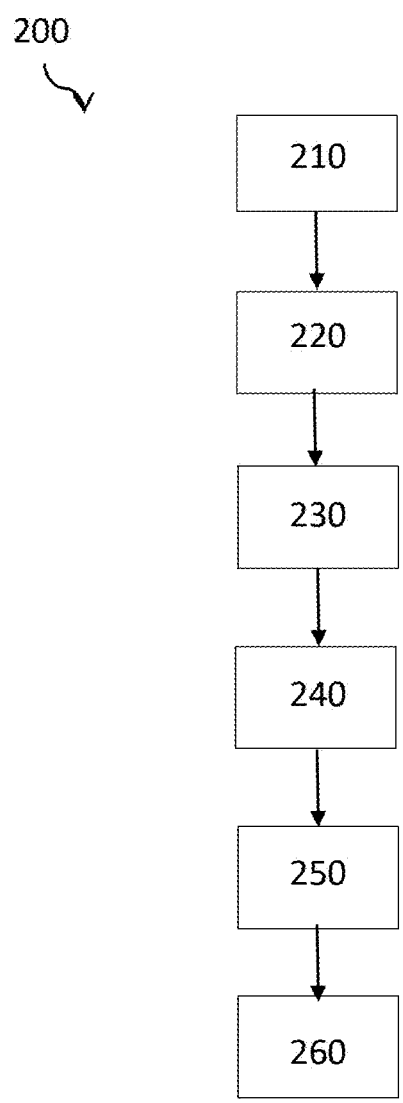
FIG. 2 is a flow chart of an exemplary method of commissioning a lighting system that can be implemented within one or more embodiments of the present invention.

FIG. 2 is a flow chart of an exemplary method 200 of commissioning a lighting system that can be implemented within one or more embodiments of the present invention while referencing FIG. 1.

As shown in FIG. 2, method 200 begins at operation 210 where after initialization of the lighting control system 100, a user selects, via the GUI at the display 112 of the smart device 110, to detect the number of endpoints (e.g., luminaires 55) on the network 80 shown in FIG. 1 using VLC and the network addresses or compressed versions of the addresses of the number of luminaires 55 detected are transmitted to the smart device 110.

From operation 210, the process continues to operation 220 where the lighting control system 100 performs a search of the luminaires 55 and displays the results of the search at the display 112. The search results also yield any newly found luminaires 55 of the number of luminaires 55 detected, without knowing the physical location of the newly found luminaires 55. This operation also enables newly added luminaires to be installed into an existing installation.

From operation 220, the process continues to operation 230 where using VLC, a broadcast message is transmitted from the controller 60 to every luminaire 55 instructing the luminaires 55 to send out their network address to the smart device 110, and receiving a response message at the smart device 110 from each luminaire 55.

From operation 230, the process continues to 240 where upon receiving the network addresses or compressed versions of the addresses at the smart device 110, and while walking under every luminaire 55, each luminaire 55 detected having a known physical location is displayed in its physical location throughout an existing building layout shown on the display 112.

According to the embodiments, the commissioning process may be performed in an automated or semi-automated environment. The building layout may be created using VLC or RF signals, at the controller 60. A mapping algorithm may employed to perform the mapping of the luminaires 55 in the building layout when the physical location thereof is known. The physical map of the building can be a high resolution architectural drawing or a sketch and can be produced at various times. If a drawing or sketch is used, an operator can scroll through the drawing for viewing via the smart device 110 of the lighting control system 100.

The display 112 can also provide additional location information such as coordinate information for each luminaire 55, the current operational (on/off) status information, and illumination level.

From operation 240, the process continues to operation 250, where using the smart device 110, the user positions the smart device 110 within a predetermined distance (e.g., beneath) of each luminaire 55 having an unknown physical location within the system 100, to identify the respective luminaire 55 by its unique network address using VLC. That is, in operation 240, the luminaire 55 can be identified by the user passing the smart device 110 under the luminaire 55 and the camera 118 detecting the associated network address and other data of the luminaire 55 using VLC.

From operation 250, the process continues to operation 260 where the user performs a drag/drop operation using the GUI on the display 112, to immediately position the detected luminaire 55 on the building layout displayed on the display 112. The associated information of the luminaire 55 is then updated to reflect the current physical location including the coordinate information, and the current operational status information and illumination level.

FIGS. 3-7 illustrate the various operations 210 through 240 performed in the method 200 shown in FIG. 2

Figure 3:
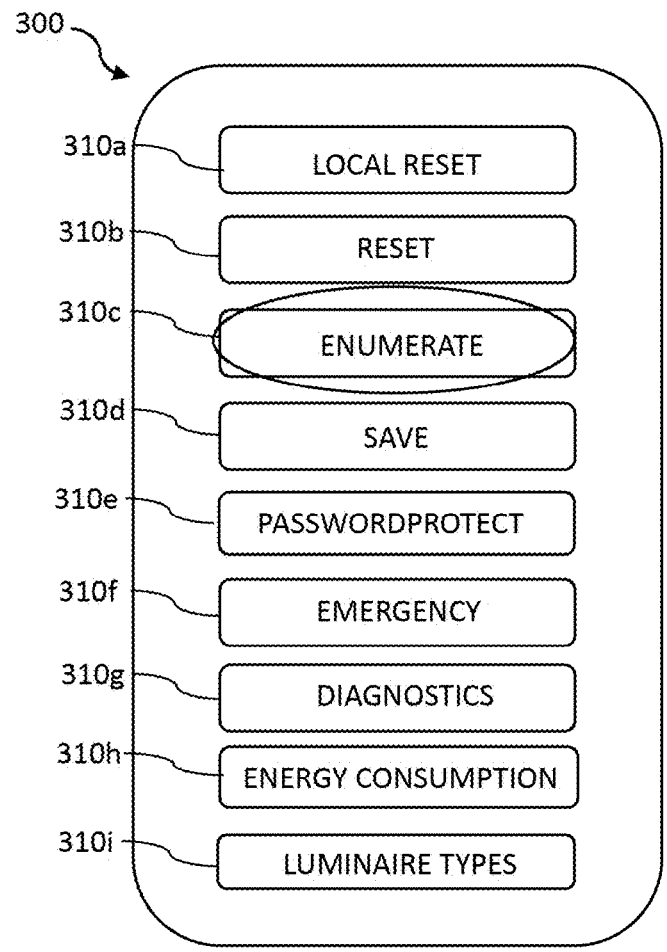
FIG. 3 illustrates a search display for searching for luminaires in the network environment that can be implemented within one or more embodiments of the present invention.

FIG. 3 illustrates a search display 300 for detecting the luminaires 55 within the network 80 (depicted in FIG. 1) that can be implemented within one or more embodiments of the present invention. As shown in FIG. 3, the search display 300 to be shown in the GUI of the display 112, includes various input options 310*a* through 310*i* including admin options, configuration operations and miscellaneous operations, for performing the commissioning process and other high-level operations of the lighting system 100 of FIG. 1.

According to one or more embodiments, the various input options include admin operations including a local reset option 310*a*, reset option 310*b*, and enumerate option 310*c*; configuration operations including save option 310*d* and password protection option 310*e*; and miscellaneous operations including emergency operation 310*f*, diagnostics option 310*g*, energy consumption option 310*h* and luminaire types option 310*i*. The present invention is not limited to any particular type of options and may therefore vary as necessary.

The user selects the enumerate option 310*c* to initiate a search to detect the number of endpoints, e.g., the luminaires 55 including any new luminaires 55 in the network 80 using VLC (depicted in FIG. 1) and the network addresses of the number of luminaires 55 detected are then transmitted to the smart device 110.

Figure 4:
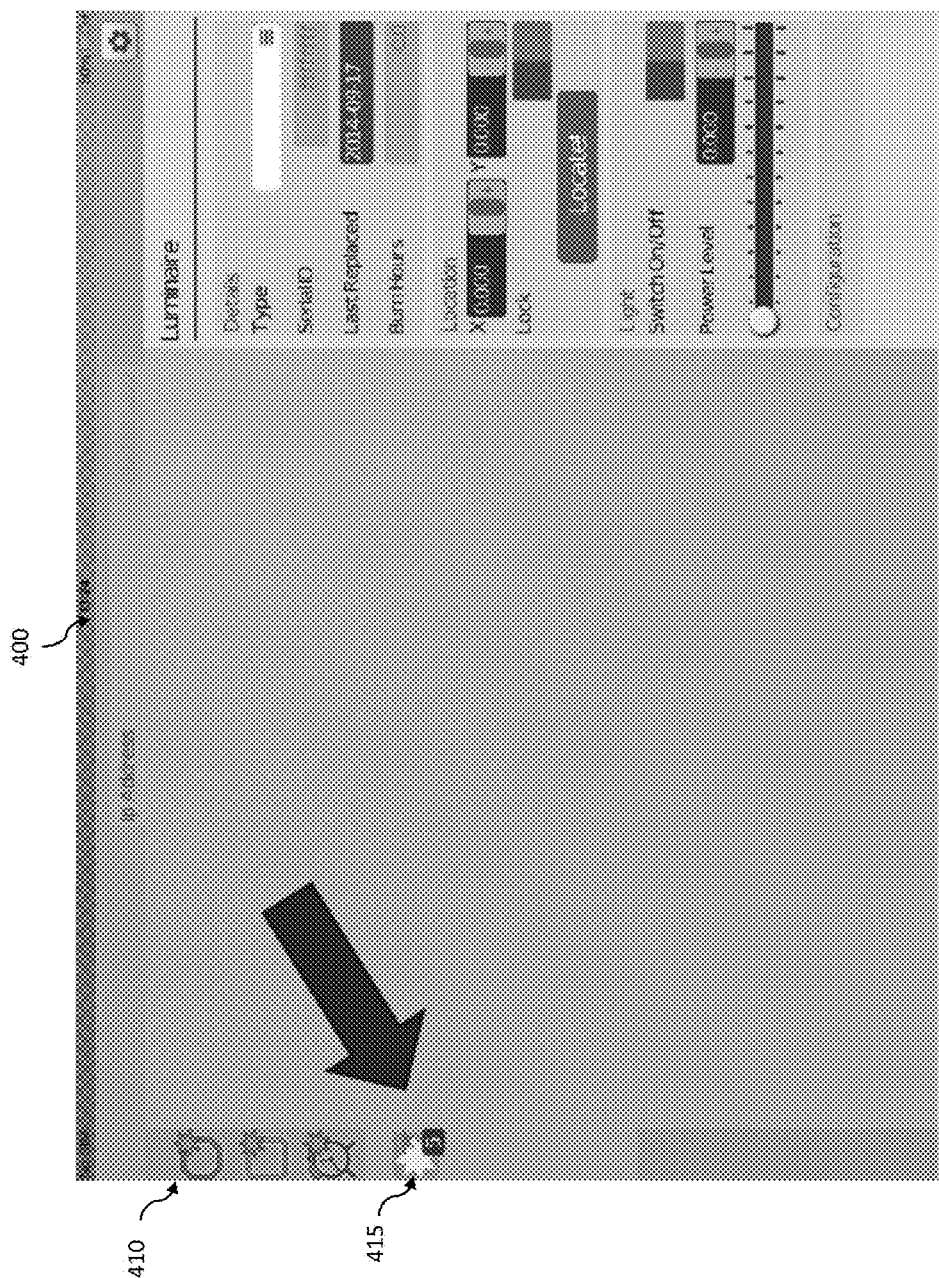
FIG. 4 illustrates a detection display for detecting newly found luminaires without knowing a physical location thereof that can be implemented within one or more embodiments of the present invention.

FIG. 4 illustrates a detection display 400 for detecting the luminaires 55 including newly found luminaires 55 without knowing a physical location thereof. As shown in FIG. 4, the newly found luminaires are listed on a sidebar 410 as indicated by the luminaires indicator 415, e.g., a flashing light or LED using the arrow. In this example, five (5) newly found luminaires 55 have been detected.

Figure 5:
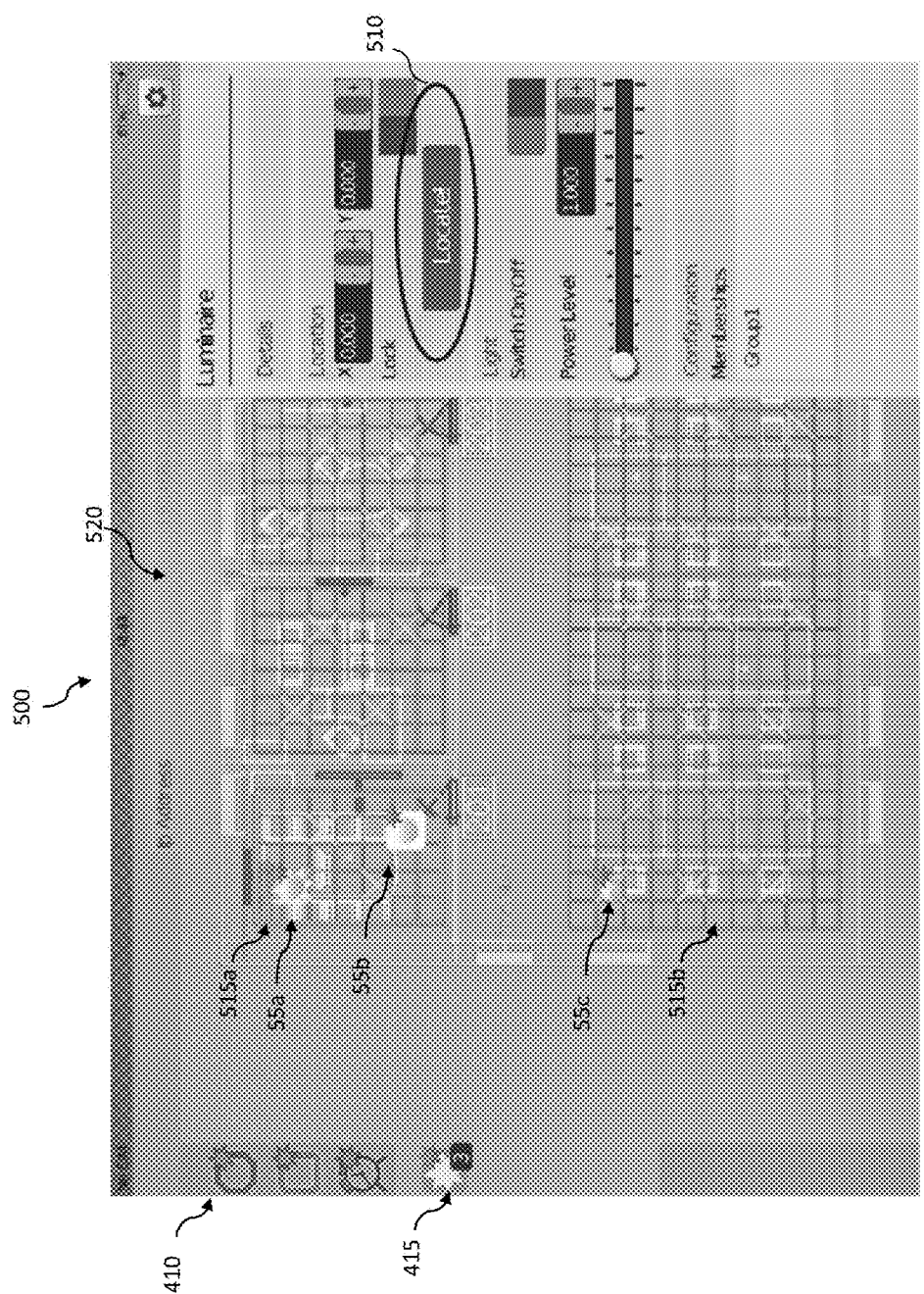
FIG. 5 illustrates a locate display for locating the newly found luminaires using VLC that can be implemented within one or more embodiments of the present invention.

FIG. 5 illustrates a locate display 500 for locating the luminaires 55 using VLC. The user selects a locate option 510 to locate the luminaire 55 using VLC where a broadcast message is transmitted to each luminaire 55 within the network 80 from the controller 60 instructing each luminaire 55 to send their network address to the smart device 110 (as depicted in FIG. 1) and a response message including the network address of each respective luminaire 55 is sent to the smart device 110 from each respective luminaire 55.

Upon receiving the network addresses of the specific luminaires the operator is near, via the smart device 110, of the luminaire I'm under each luminaire 55*a*, 55*b* and 55*c* having a known physical location is displayed in its respective physical location (e.g., room 515*a* and 515*b*) on the existing building layout 520. As shown in FIG. 5, two (2) of the five (5) newly found luminaires 55*a* and 55*b* are displayed via a flashing light icon (e.g., LED) in their respective physical locations in a room 515*a* and a third luminaire 55*c* is displayed in its physical location in room 515*b* on a building layout 520.

The luminaire indicator 415 is then updated to reflect any remaining luminaires (e.g., three (3) remaining newly found luminaires). As shown in FIG. 5, additional information can also be provided including for example, coordinate information for each luminaire, current operational (on/off) status information, illumination power level and membership information indicating whether the respective luminaire belongs to a group (e.g., Group 1) of luminaires.

Figure 6:
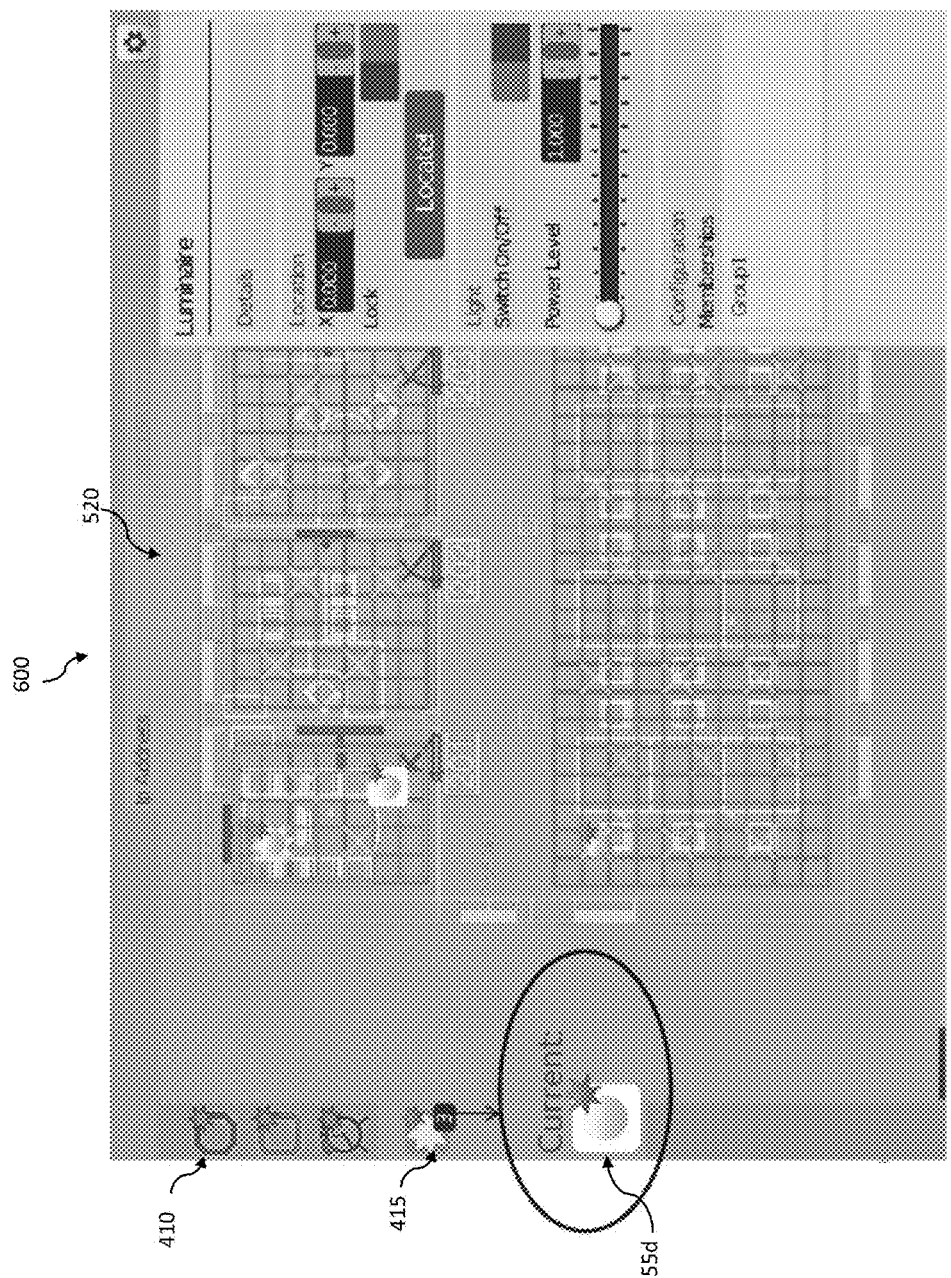
FIG. 6 illustrates an identification display for identifying the newly found luminaires that can be implemented within one or more embodiments of the present invention.

FIG. 6 illustrates an identification display 600 for identifying the newly found luminaires as indicated by the luminaire indicator 415 where a physical location thereof remain unknown. In FIG. 6, when a user walks within a predetermined distance from a newly found luminaire 55*d*, the respective luminaire 55*d* is reflected as "current" along the sidebar 410 of the display 600 as indicated by the circle. Using the camera 118 at the smart device 110, the network address of the luminaire 55*d* is detected by VLC.

Figure 7:
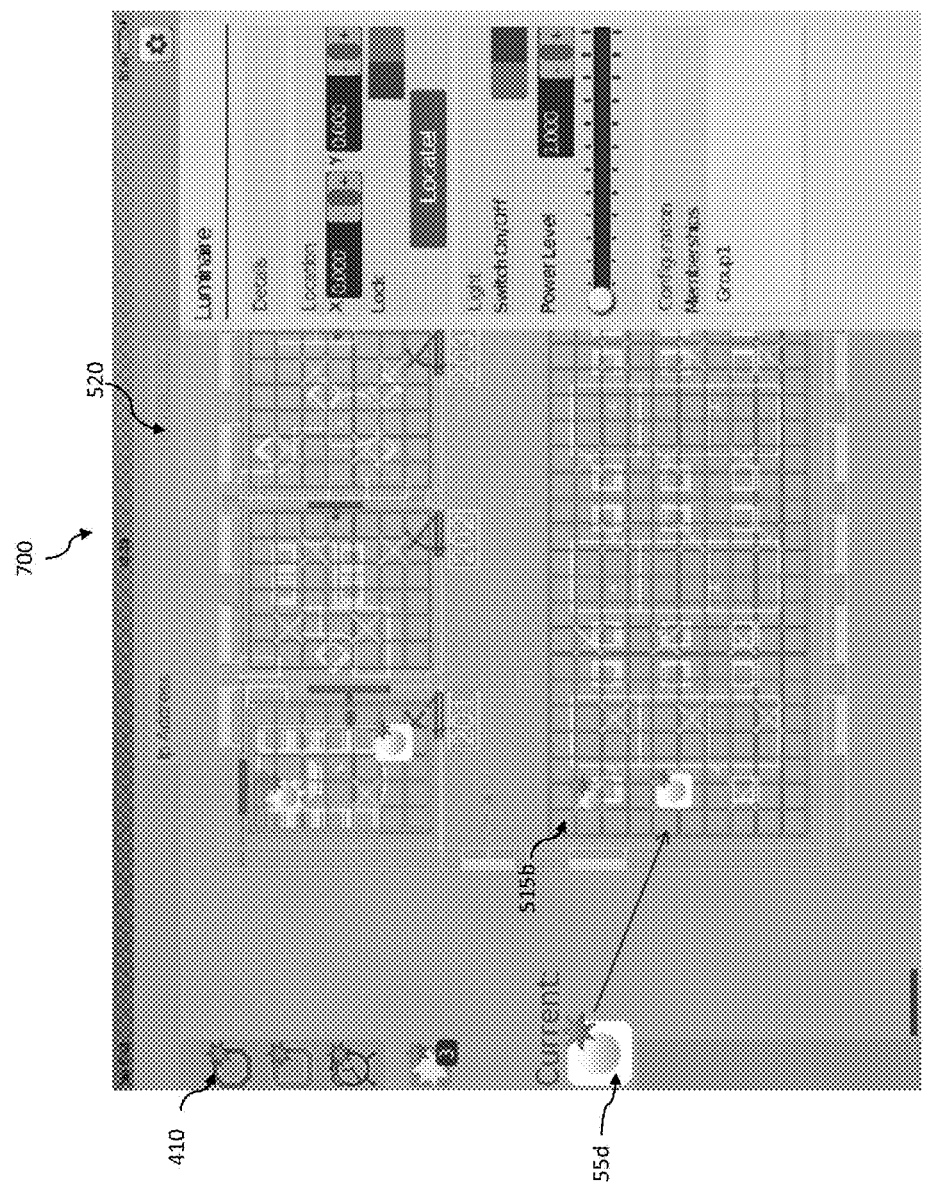
FIG. 7 illustrates positioning display for positioning the luminaires on the building layout that can be implemented within one or more embodiments of the present invention.

FIG. 7 illustrates positioning display 700 for positioning the newly found luminaires on the building layout 520. As shown in FIG. 7, when the user physically locates the newly found luminaire 55*d*, the user can then perform a drag and drop operation from the sidebar 410, positioning the newly found luminaire 55*d* in a corresponding physical location (e.g., within room 515*b*) as indicated by the arrow.

After all of the luminaires 55 have been commissioned, the smart device 110 receives all of the address data associated with the luminaires 55 and the lighting control system 100 is returned to its normal operation.

Embodiments of the present invention provide several advantages including allowing a user to efficiently correct the building layout and locate the luminaires by walking under each luminaire, identifying it using VLC, and performing a drop/drag operation to update the building layout to reflect the current physical location of the luminaire instead manually assigning the physical location to each luminaire. Embodiments of the present invention also provide the advantages of saving time and work, and with use of the interactive graphical interface in the system thereby eliminates any kind of paper-based mapping of existing methods.

This written description uses examples to disclose the invention including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A lighting system comprising:
   a plurality of luminaires each of which can be assigned a unique network address on a network;
   at least one controller in communication with the plurality of luminaires via a communication line in the network and configured to control the plurality of luminaires, the at least one controller further configured to transmit a broadcast message to the plurality of luminaires instructing each luminaire of the plurality of luminaires to transmit a unique network address thereof to a smart device; and
   the smart device, configured to
   (i) wirelessly communicate with the at least one controller, and
   (ii) perform a commissioning operation of the plurality of luminaires in the network using visual light communication (VLC), wherein the smart device is positioned at a predetermined distance of the plurality of luminaires.

2. The lighting system of claim 1, wherein the smart device comprising:
   a camera configured to capture data including the unique network address and illumination data of each luminaire of the plurality of luminaires;
   a memory configured to store instructions for performing the commissioning operation;
   a display having a graphical user interface (GUI) configured to display data and receive user input via the GUI for performing the commissioning operation;
   a processor configured to process data received from the at least one controller and the plurality of luminaires; and
   at least one network interface for communicating the at least one controller and the smart device.

3. The lighting system of claim 2, wherein after initializing the lighting control system and determining the unique network address of each luminaire, the smart device is configured to search and detect a number of luminaires on the network using VLC.

4. The lighting system of claim 3, wherein the smart device is further configured to receive a response message including the network address from each luminaire.

5. The lighting system of claim 4, wherein upon receiving the response message, the display at the smart device is configured to display any luminaires of the plurality of luminaires having a known physical location on a building layout thereon, and a total number of remaining luminaires of the plurality of luminaires having an unknown physical location.

6. The lighting system of claim 5, wherein the smart device being operated by a user, is positioned at a predetermined distance of a remaining luminaire, and the camera of the smart device is configured to identify the remaining luminaire using VLC, by obtaining the unique network address of the remaining luminaire.

7. The lighting system of claim 6, wherein the smart device is further configured to perform a drop/drag operation by the user at the GUI, to position the remaining luminaire in an associated physical location on the building layout upon receiving the unique network address of the remaining luminaire.

8. A method for commissioning a lighting system including a plurality of luminaires, the method comprising:
   wirelessly communicating between a smart device and at least one controller of the lighting system within a network;
   transmitting a broadcast message from the at least one controller to each luminaire of the plurality of luminaires, instructing each luminaire to transmit a network address thereof to the smart device;
   receiving, using visual light communication (VLC) at the smart device, wherein the smart device is positioned at a predetermined distance of the plurality of luminaires, a response message including the network address from each luminaire; and
   performing, by the smart device, a commissioning operation of the plurality of luminaires.

9. The method of claim 8, further comprising:
   detecting the plurality of luminaires on the network using VLC, and the network address of each luminaire of the plurality of luminaires detected; and
   displaying the luminaires of the plurality of luminaires having a known physical location on a building layout displayed at the smart device.

10. The method of claim 9, further comprising:
    detecting, at the smart device, a total number of remaining luminaires of the plurality of luminaires having an unknown physical location.

11. The method of claim 10, further comprising:
    identifying a remaining luminaire by positioning the smart device at a predetermined distance from the remaining luminaires, and obtaining the network address of the remaining luminaires using VLC, via a camera of the smart device.

12. The method of claim 11, further comprising:
    performing a drop/drag operation by a user at the display of the smart device, to position the remaining luminaires in an associated physical location on the building layout.

13. A method for commissioning a lighting system including a plurality of luminaires, the method comprising:
    wirelessly communicating between a smart device and at least one controller of the lighting system within a network;
    transmitting a broadcast message from the at least one controller to each luminaire of the plurality of luminaires, instructing each luminaire to transmit a network address thereof to the smart device;
    receiving, using visual light communication (VLC) at the smart device, a response message including the network address from each luminaire; and
    performing, by the smart device, a commissioning operation of the plurality of luminaires;
    the method further comprising:
    detecting the plurality of luminaires on the network using VLC, and the network address of each luminaire of the plurality of luminaires detected;

displaying the luminaires of the plurality of luminaires having a known physical location on a building layout displayed at the smart device; and detecting, at the smart device, a total number of remaining luminaires of the plurality of luminaires having an unknown physical location.

\* \* \* \* \*